(12) United States Patent
Nebiolo et al.

(10) Patent No.: US 12,383,968 B1
(45) Date of Patent: Aug. 12, 2025

(54) PIPE CUTTING TOOL

(71) Applicant: PROSHALE LLC, Spring, TX (US)

(72) Inventors: Martin Mauro Nebiolo, Neuquén Capital (AR); Cristian Brendstrup, Neuquén Capital (AR); Christian Cerne, Spring, TX (US); Gustavo Dietrich, Neuquén Capital (AR)

(73) Assignee: PROSHALE LLC, Spring, TX (US)

( * ) Notice: Subject to any disclaimer, the term of this patent is extended or adjusted under 35 U.S.C. 154(b) by 0 days.

(21) Appl. No.: 18/807,917

(22) Filed: Aug. 17, 2024

Related U.S. Application Data

(63) Continuation of application No. 18/783,803, filed on Jul. 25, 2024.

(51) Int. Cl.
*B23D 21/14* (2006.01)
*E21B 23/04* (2006.01)

(52) U.S. Cl.
CPC .......... *B23D 21/14* (2013.01); *E21B 23/0411* (2020.05)

(58) Field of Classification Search
CPC ........ E21B 29/002; E21B 23/08; E21B 33/12; B24C 1/045
See application file for complete search history.

(56) References Cited

U.S. PATENT DOCUMENTS

| | | | | |
|---|---|---|---|---|
| 3,565,192 A * | 2/1971 | McLarty | ................ | E21B 10/32 175/246 |
| 3,713,499 A * | 1/1973 | Arscott | ................ | E21B 21/066 175/66 |
| 3,749,511 A * | 7/1973 | Mayall | ................ | E21B 4/02 415/113 |
| 4,346,761 A * | 8/1982 | Skinner | ................ | E21B 43/114 166/206 |
| 10,119,351 B2 * | 11/2018 | Flores | ................ | E21B 43/26 |
| 11,624,265 B1 * | 4/2023 | Sehsah | ................ | E21B 29/002 166/298 |
| 12,084,935 B2 * | 9/2024 | Alsheikh | ................ | E21B 29/005 |
| 2003/0070805 A1 * | 4/2003 | Bassin | ................ | E21B 43/114 166/305.1 |
| 2004/0089450 A1 * | 5/2004 | Slade | ................ | E21B 41/0078 166/55.7 |
| 2007/0151724 A1 * | 7/2007 | Ohmer | ................ | E21B 47/01 166/187 |
| 2011/0297368 A1 * | 12/2011 | Lembcke | ................ | E21B 33/1293 166/118 |
| 2012/0012342 A1 * | 1/2012 | Wilkin | ................ | E21B 33/1285 166/387 |

(Continued)

*Primary Examiner* — Steven A MacDonald
(74) *Attorney, Agent, or Firm* — Eric P. Mirabel

(57) ABSTRACT

A pipe-cutting tool, which can be independently pumped down to cut a wellbore pipe or casing, is disclosed. When the tool is lowered into the wellbore, a pump down ring, included in the tool, remains flush with the inner surface of the pipe. To power the tool's descent, high-pressure fluid is pumped into the wellbore. On reaching the target location, a swellable sleeve included in the tool, on being exposed to fluid in the wellbore, expands to push against the inner surface of the pipe, lodges the tool at the location, and seals any fluid flow path bypassing the tool. Thereafter, high-pressure abrasive fluid is pumped through the tool to eject in the form of high-pressure abrasive fluid jets, which cut through the wellbore pipe at the target location.

15 Claims, 4 Drawing Sheets

(56) References Cited

U.S. PATENT DOCUMENTS

| | | | | |
|---|---|---|---|---|
| 2012/0227986 A1* | 9/2012 | Sevre | .................. | E21B 33/1208 |
| | | | | 166/387 |
| 2012/0312560 A1* | 12/2012 | Bahr | .................. | E21B 33/1208 |
| | | | | 166/387 |
| 2014/0110119 A1* | 4/2014 | Luyster | ................ | E21B 33/126 |
| | | | | 166/305.1 |
| 2014/0352964 A1* | 12/2014 | Surjaatmadja | .......... | E21B 29/06 |
| | | | | 73/865.9 |
| 2015/0144340 A1* | 5/2015 | Surjaatmadja | ........ | E21B 29/005 |
| | | | | 166/55 |
| 2015/0233218 A1* | 8/2015 | Myhre | .................. | E21B 43/114 |
| | | | | 166/281 |
| 2016/0305210 A1* | 10/2016 | Flores | ................... | E21B 33/124 |
| 2017/0030157 A1* | 2/2017 | Hansen | .................. | E21B 33/13 |
| 2018/0021922 A1* | 1/2018 | Linde | ...................... | B24C 1/045 |
| | | | | 451/2 |
| 2018/0135381 A1* | 5/2018 | Tolman | ................ | E21B 33/138 |
| 2018/0163497 A1* | 6/2018 | Younger | ................ | E21B 29/06 |
| 2019/0085685 A1* | 3/2019 | McBride | .............. | E21B 47/024 |
| 2022/0065061 A1* | 3/2022 | Sehsah | ................... | E21B 47/092 |
| 2022/0341273 A1* | 10/2022 | Al-Mousa | ............. | E21B 31/107 |
| 2024/0191586 A1* | 6/2024 | Alsheikh | ............... | E21B 29/005 |
| 2024/0426189 A1* | 12/2024 | Garcia | ................ | E21B 33/1208 |

* cited by examiner

PIPE CUTTING TOOL

BACKGROUND

In the oil and gas industry, there is often a need to cut a wellbore pipe or a coiled tubing downhole. For instance, when a drill pipe, coiled tubing or any downhole equipment deployed in the wellbore (or deployed with the coiled tubing) gets stuck, to recover the pipe upper portion, it is often necessary to sever the pipe. Sometimes, downhole tubing also needs to be cut for repairs or to remove it from an abandoned well. Several cutting devices have been used for these purposes, but most of them require a separate conveyance method, like slickline, wireline, or coil tubing. When cutting coiled tubing at any point below the surface, there is a lack of tools or equipment that can be deployed inside the coil tubing, without the need for cutting the coil tubing at the surface in order to gain access to the coil tubing inner diameter.

Hence, there is a need for an improved downhole cutting device that would be capable of being independently pumped down into a wellbore (or into a coiled tubing, as the case may be) and which would then hold its position at the target location downhole. Still further, compared with current options, the device should be easier to place, and be easier to operate by eliminating the need for additional conveyance equipment to place it downhole.

SUMMARY

The invention is a generally cylindrically shaped pipe-cutting tool, operated using abrasive fluid, which can be independently pumped down and stationed in a wellbore pipe, coiled tubing (or casing). The tool is operated to initiate and cease cutting downhole by regulating the flow of pressurized abrasive fluid through it.

The tool includes a pump down ring and a swellable sleeve, both on the outer surface of the tool. Preferably, the pump down ring is made of a flexible material (such as rubber) and is located below the swellable sleeve. While the pump down ring, under fluid pressure, assists the descent of the tool within a wellbore pipe (or coiled tubing), the swellable sleeve, when exposed to fluids (such as drilling mud, water, oil-based fluid systems, or any other suitable fluid) for a sufficient period, absorbs fluid and expands to increase its outer diameter. The swellable sleeve is preferably made of swellable material supplied by RUBBERATKINS LIMITED, Aberdeen, Scotland.

To perform a cut at a target location of a wellbore pipe or a coiled tubing, firstly, the tool is lowered in or positioned at a point inside the pumping lines that would allow it to enter the coiled tubing once fluid is pumped. The pump down ring is preferably flush with the inner surface of the wellbore pipe (or of the coiled tubing) and catches the fluid pressure on its upper surface to force the tool down to its target location.

If the target location is at a downhole restriction of some type (for example, a connector of a coiled tubing or a nipple connector of a threaded pipe, as the case may be), the tool's descent stops at the restriction. However, if the target location lies in a restriction-free path, the tool's level is controlled by the quantity of fluid pumped into the wellbore pipe (or into the coiled tubing). Based on the internal diameter of the wellbore pipe or the coiled tubing, and the quantity of fluid pumped in, the depth of the tool can be calculated. Once the tool descends to the depth of the target location, pumping is halted to stop further descent of the tool.

At this stage, the swellable sleeve remains fully submerged in the fluid. Exposure to the oil or water-based fluid for a sufficient time causes the sleeve to absorb fluid and expand. As a result, its outer diameter increases to the extent that the outer surface of the sleeve pushes against the internal surface of the wellbore pipe or of coiled tubing, and lodges the tool at the target location. The expanded sleeve also seals any fluid flow path bypassing around the tool.

Once the tool is lodged in place, high-pressure abrasive fluid, usually a mixture of water, gel and sand or another solid in suspension is pumped in, and it enters and flows through the tool. Inflowing abrasive fluid gets ejected from fluid ejection nozzles of the tool in the form of high-pressure jets which cut the pipe or coiled tubing. Preferably, the direction of the high-pressure jets could be set at different angles depending on a particular application and need not necessarily lie transverse to the axis of the tool.

In addition to facilitating firm positioning of the tool and sealing off fluid flow around the tool, the swollen sleeve also acts as a damper and absorber of vibrations produced during cutting operations. This enhanced stability during tool operation aids quick and effective pipe severance.

Embodiments of the present invention will be discussed in greater detail with reference to the accompanying figures in the detailed description that follows.

It should be understood that the drawings and the associated descriptions below are intended to illustrate one or more embodiments of the present invention and not to limit the scope or the number of different possible embodiments of the invention.

It should be noted that the drawings are not necessarily drawn to scale.

DETAILED DESCRIPTION

In the description of the invention which follows, unless specified otherwise, terms 'upper', 'upward' and 'upwards' are used to denote a direction towards the top of the wellbore or towards the source of fluid flowing through the tool. Similarly, terms 'lower', 'below,' 'downward,' and 'downwards' are used to denote the direction of fluid flowing through the tool, which is top to bottom in all figures.

Similarly, in the entire description provided herein, the term 'wellbore pipe' has been used synonymously to denote 'wellbore casing' or 'wellbore wall' or 'wellbore pipe' or 'wellbore piping' or 'coil tubing' or 'drill string' or 'casing drill pipe' or 'drill string wall'.

Some components and/or portions of the embodiments of the invention illustrated in the figures may not be fully discussed in the description which follows, because they are not needed to provide a full and complete description of the embodiments of the invention, which is adequate for comprehension by anyone with relevant experience in the field.

Figure 1:
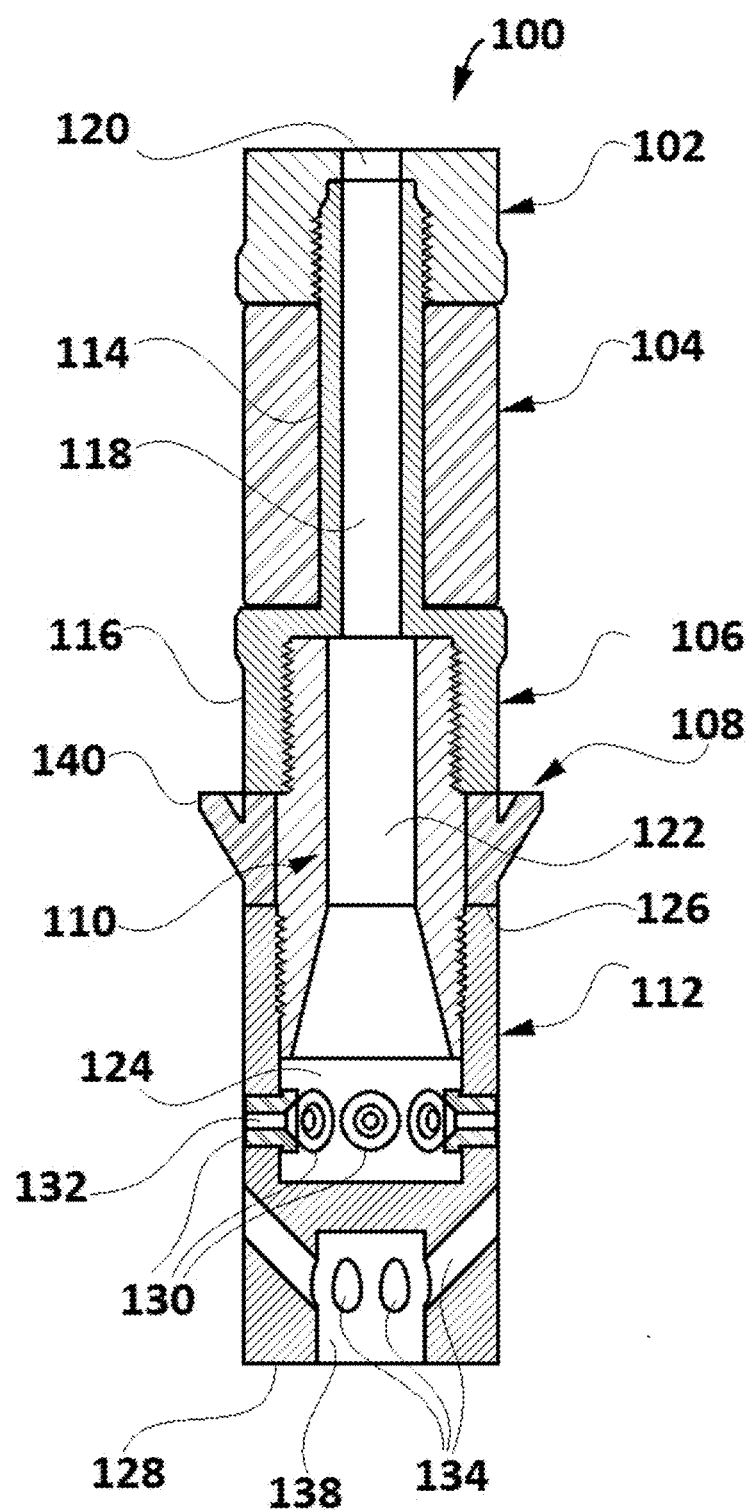
FIG. 1 illustrates a cross-section of a first embodiment of an abrasive fluid operated pipe cutting tool in accordance with the present invention.

Reference will now be made in detail to a first embodiment of an abrasive fluid operated pipe cutting tool of the invention with reference to the accompanying figures. FIG. 1 illustrates a cross section of a first embodiment of generally cylindrically shaped abrasive fluid operated pipe cutting tool 100. Tool 100 includes an upper retainer tube 102, a swellable sleeve 104, a connector tube 106, a pump down ring 108, a connector flow tube 110, and an ejector tube 112. Other parts in FIG. 1 are discussed below.

As illustrated in FIG. 1, the connector tube 106 includes an upper narrow tube 114, a lower wider tube 116 and a central bore 118 extending through both the upper narrow tube 114 and the lower wider tube 116. Central bore 118 is narrower within the upper narrow tube 114 and is wider within lower wider tube 116. Similarly, the upper retainer tube 102, and the connector flow tube 110 also include a bore extending through them, illustrated as bore 120 and bore 122 respectively. As shown, bore 122 is narrower towards the upper end of the connector flow tube 110, and flares towards its lower end.

The ejector tube 112 further includes bore 124 which has an upper end that does not extend through the tool. Still further, multiple fluid ejection nozzles 130 are screwed, welded or held in position by interference symmetrically around the ejector tube 112. Each fluid ejection nozzle 130 includes a fluid ejection channel 132, which connects with bore 124.

The lower portion of the ejector tube 112 includes a lower bore 138 which extends from lower end 128 but does not extend through the tool, and is not connected with upper bore 124. Multiple fluid flow channels 134 are distributed symmetrically around the lower bore 138. The flow channels 134 connect the lower bore 138 with the exterior of ejector tube 112 (and that of tool 100). In this embodiment, as illustrated, fluid flow channels 134 are directed at an angle towards the upper end 126 of ejector tube 112.

The swellable sleeve 104 is a tubular structure preferably made of material such as the swellable product supplied by RUBBERATKINS LIMITED, Aberdeen, Scotland. When exposed to fluids (preferably wellbore fluids, including drilling mud, water, oil-based fluid systems, or any other suitable fluid), the sleeve absorbs fluid and swells to increase its outer diameter.

The pump down ring 108 includes an annular fin 140. The annular fin 140, surrounds the tubular portion of the pump down ring 108, and is flared upwardly in this embodiment. In a dry state tool 100, the outermost periphery of the annular fin 140 has a larger outer diameter than any other component of tool 100. Preferably, annular fin 140 is flush with the inner surface of the wellbore pipe or coiled tubing, in which tool 100 is intended to be used.

For assembling tool 100, firstly, a sleeve 104 (before fluid causes its swelling) is slipped over the upper narrow tube 114 and is placed adjacent to the upper end of the lower wider tube 116. Once sleeve 104 is in place, an externally threaded upper end of upper narrow tube 114 protrudes from the upper end of sleeve 104. In the next step, the internally threaded lower end of upper retainer tube 102 is screwed over the protruding externally threaded upper end of upper narrow tube 114. Sleeve 104 is now confined between the lower end of the upper retainer tube 102 and the upper end of the lower wider tube 116.

In the next step, the externally threaded upper end of the connector flow tube 110 is screwed into the internally threaded lower end of lower wider tube 116. Thus, the upper end of the connector flow tube 110 gets screwed into the lower end of bore 118. Thereafter, the pump down ring 108 is slipped over the unthreaded middle portion of the connector flow tube 110 such that the annular fin 140 is tilted upwards (i.e. towards the upper end of tool 100). Finally, the externally threaded lower end of the connector flow tube 110 is screwed into the internally threaded upper end 126 of the ejector tube 112. Once the ejector tube 112 is screwed into the connector flow tube 110, the pump down ring 108 is confined between the lower end of the upper end of the lower wider tube 116 and the upper end of the ejector tube 112.

In the assembled tool 100, bores 118, 120, 122, and 124 extend collinearly and provide a common fluid flow path for pressurized fluid to flow through the tool 100. In an operational tool 100, while the upper end of the bore 120 provides an entrance for pressurized fluid to flow through the tool 100, and fluid ejection nozzles 130 provide exits for the pressurized fluid, which is ejected as high-pressure abrasive fluid jets (shown as jets 204 in FIG. 4).

Figure 2:
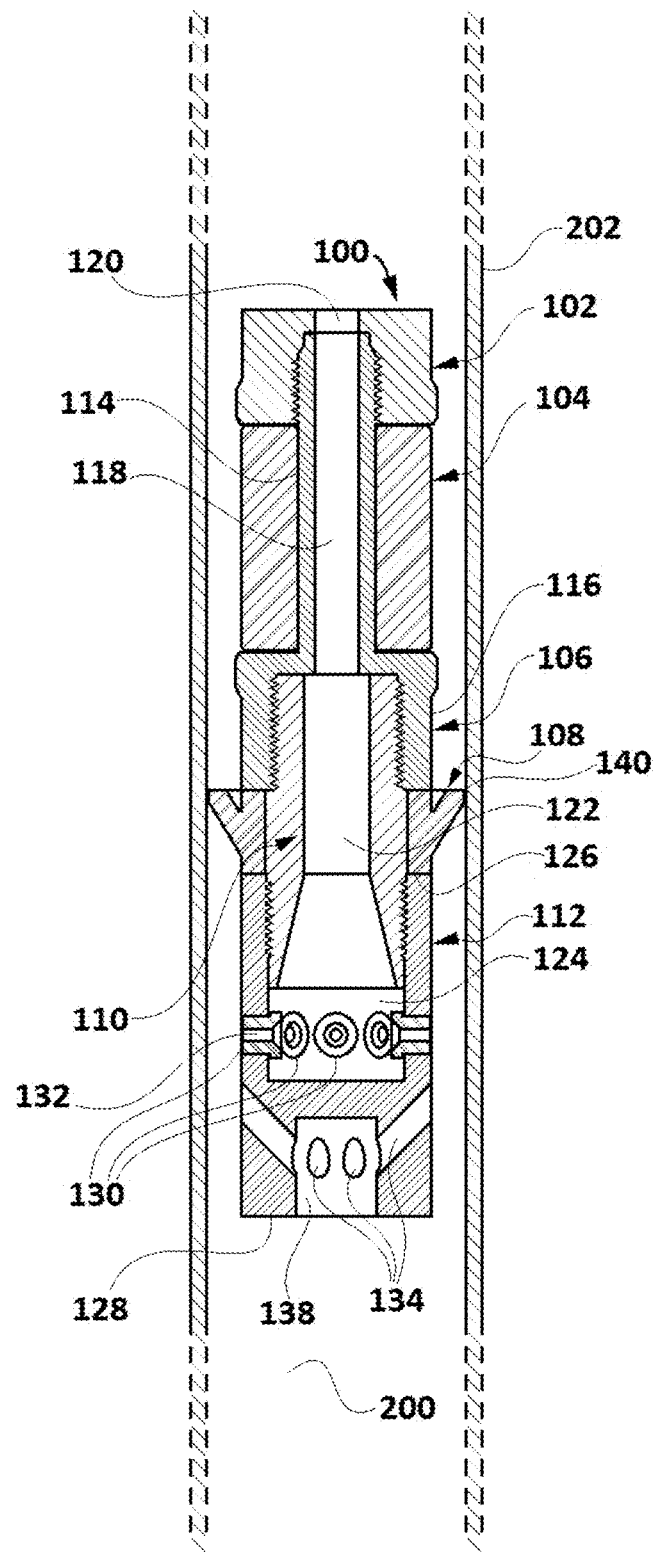
FIG. 2 illustrates a cross-section of the tool of FIG. 1 in a wellbore.
Figure 3:
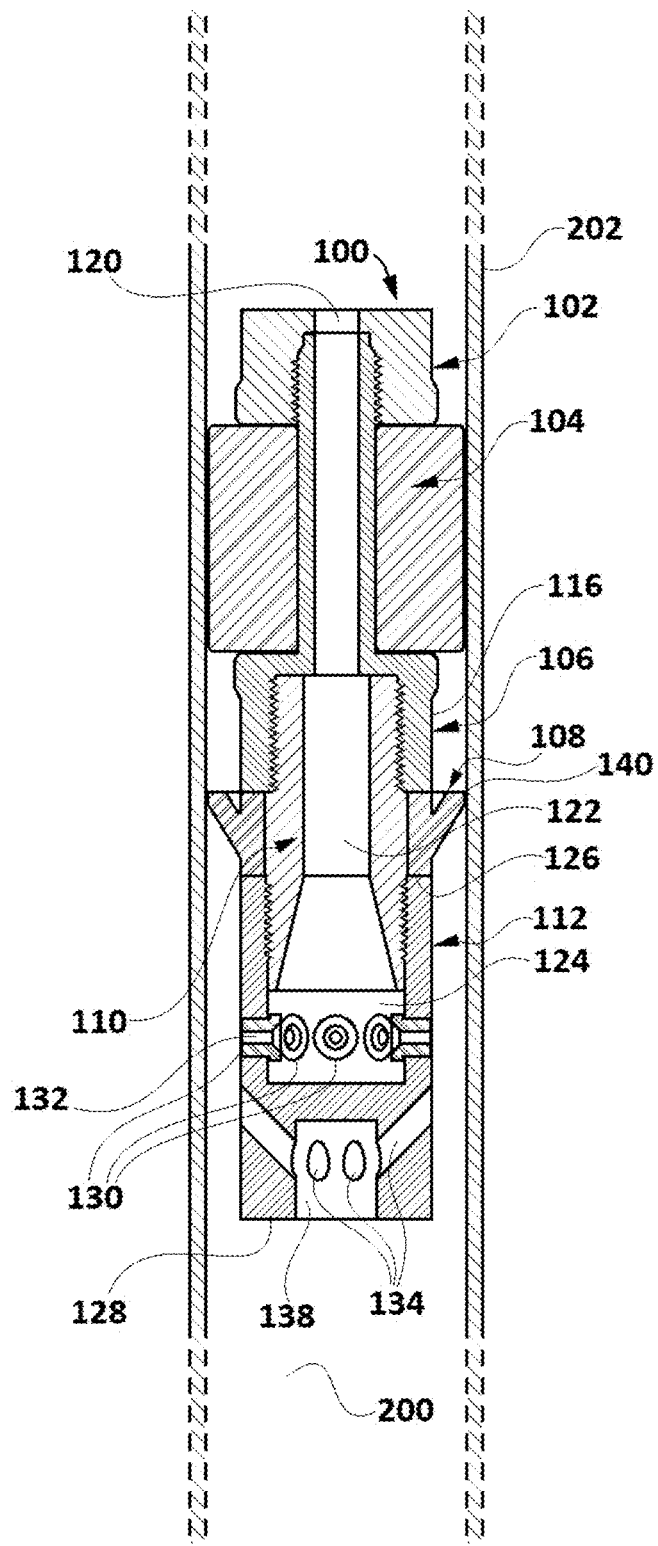
FIG. 3 illustrates a cross section of the tool of FIG. 2 lodged in the wellbore with its swellable sleeve expanded.
Figure 4:
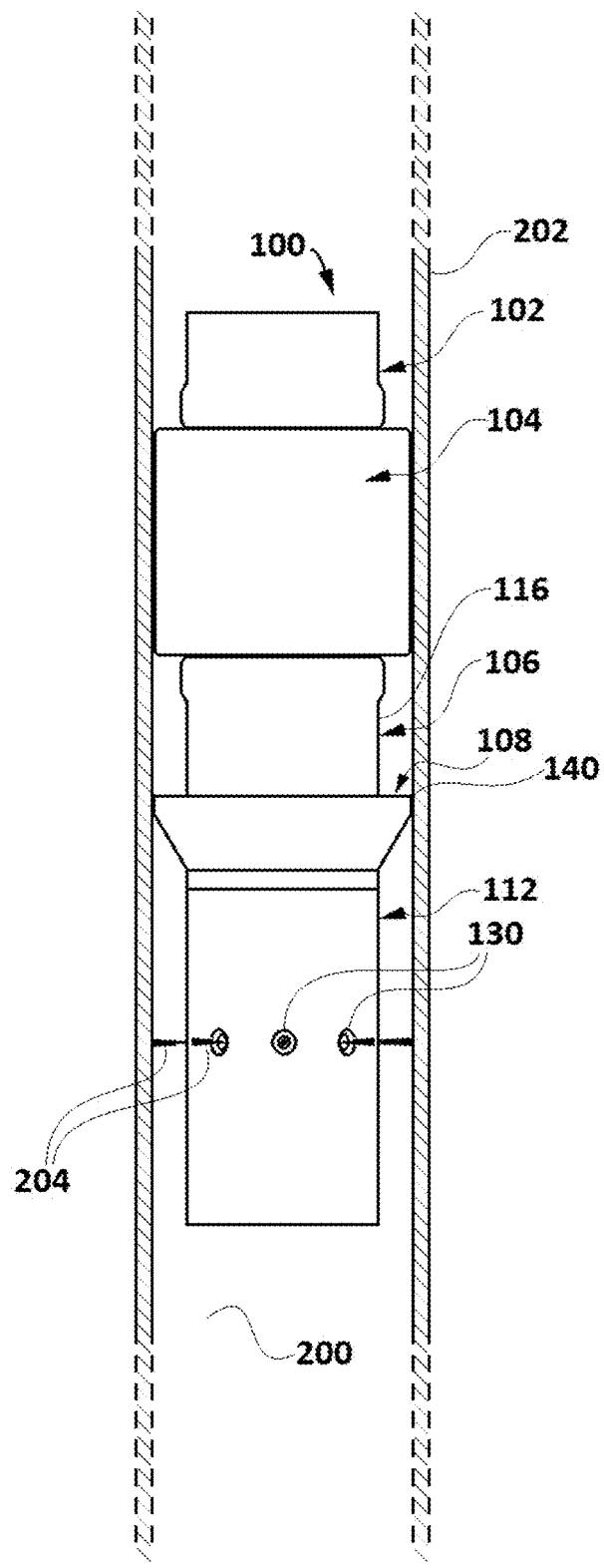
FIG. 4 illustrates the tool of FIG. 3 with inflow of high-pressure abrasive fluid, and ejecting high pressure jets of abrasive fluid, for cutting the wellbore pipe. Note that only the wellbore pipe is shown in cross-section.

Operation of the assembled dry abrasive fluid-operated pipe cutting tool 100, when deployed in a wellbore for cutting wellbore pipe at a target location will now be explained with the help of FIGS. 2, 3 and 4.

Firstly, the assembled tool 100 is lowered into wellbore 200 defined by a wellbore pipe 202. Thereafter, high-pressure fluid (such as drilling mud) is pumped into the wellbore pipe 202 to power the descent of the tool 100 towards a target location downhole.

If the target location is at a downhole restriction of some type (for example, a connector of a coiled tubing, or a nipple connector of a threaded pipe, as the case may be) which restricts descent of the tool 100, the descending tool 100 stops at the restriction. However, if the target location lies in a restriction-free path, the descent of the tool 100 is controlled by controlling the quantity of high-pressure fluid pumped into the wellbore pipe 202.

Based on the internal diameter of the wellbore pipe 202 and the quantity of fluid being pumped into the well pipe 202, the instantaneous depth of tool 100 can be calculated according to the formula:

$$D=Q/(\pi \times r^2)$$

Where:
'D'=depth of the tool (in meters)
'Q'=is volume of fluid being pumped into the wellbore pipe (in liters)
'r'=is radius of the wellbore pipe (in meters)
'π'=3.14 (a numeric constant).

As soon as the tool 100 descends to the depth of the target location, further pumping of fluid into the wellbore pipe 202 is halted to stop further downward descent of the tool 100.

At this stage, with tool 100 stationed the target location, sleeve 104 remains fully submerged in the fluid. Exposure to the fluid for a sufficient time allows the sleeve 104 to swell (by absorbing fluid) and expand. As a result, its outer diameter increases to lodge tool 100 at the target location. The expanded sleeve 104 also seals any fluid flow path around the tool (see FIG. 3).

Once the tool 100 is lodged in place, high pressure abrasive fluid (usually a mixture of water, gel, and a solid particulate, such as sand, in suspension) is pumped into the wellbore pipe 202, and it enters and flows through tool 100 (since bypass paths around the tool 100 for fluid are sealed by expanded sleeve 104). Inflowing abrasive fluid gets ejected from fluid ejection nozzles 130 in the form of high-pressure jets 204 which cut the wellbore pipe 202 (see FIG. 4; cut not illustrated). Preferably, the direction of the high-pressure jets 204 could be set at different angles depending on a particular application and need not necessarily lie transverse to the axis of the tool 100.

It is to be noted that apart from facilitating firmly stationing the tool 100 and sealing off fluid flow exterior to the tool, the swollen sleeve 104 also acts as damper and absorber of vibrations produced during cutting operations.

It is to be noted that, though the explanation above describes the operation of tool 100 in a wellbore pipe, embodiments of the tool of the present invention can also be operated in a coiled tubing of a wellbore. When intended to be operated in a coiled tubing, dimensions of the tool are selected based on the dimensions of the internal diameter of the coiled tubing.

It is to be understood that the foregoing description and embodiments are intended to merely illustrate and not limit the scope of the invention. Other embodiments, modifications, variations and equivalents of the invention are apparent to those skilled in the art and are also within the scope of the invention, which is only described and limited in the claims which follow, and not elsewhere.

What is claimed is:

1. A generally cylindrical shaped abrasive fluid operated pipe cutting tool having a first upper end and a lower end comprising:
   a pump down ring, wherein an outermost diameter of said ring is larger than that of any other component of said tool when the tool is in dry state;
   a swellable sleeve, upstream from said pump down ring, surrounding at least a portion of an outer surface of said tool, said sleeve being capable of expanding when exposed to a first oil or water-based fluid; and
   one or more flow channels connecting a portion of the outer surface of the tool downstream the pump-down ring with the lower end of the tool; and
   a fluid flow path having, at the first upper end of the tool, an entrance for pressurized abrasive fluid to flow into the tool, and multiple fluid ejection nozzles downstream of said swellable sleeve, and said multiple fluid ejection nozzles for ejection of inflowing pressurized abrasive fluid from the tool in the form of pressurized abrasive fluid jets, the swellable sleeve and abrasive fluid jets configured such that:
      exposing said sleeve to said first oil or water-based fluid causes the sleeve to expand, wherein expansion of said sleeve seals fluid flow paths around the tool and stops fluid flow to the pump-down ring; and
      pumping pressurized fluid into entrance of said fluid flow path causes ejection of pressurized abrasive fluid jets from said nozzles.

2. The tool of claim 1, wherein said swellable sleeve is made of swellable rubber.

3. The tool of claim 1, wherein said first oil or water-based fluid includes aqueous solutions, drilling mud or oil-based fluids.

4. The tool of claim 1, wherein said abrasive fluid is a mixture of water, gel, and sand or another solid in suspension.

5. The tool of claim 1, wherein the fluid ejection nozzles are angled upstream.

6. The tool of claim 1, wherein the pump down ring includes an annular fin.

7. The tool of claim 6, wherein the annular fin is configured to lie flush with the inner surface of the pipe when in position.

8. A method of cutting a pipe comprising:
   i) lowering a generally cylindrical-shaped abrasive fluid-operated pipe-cutting tool having a first upper end and a lower end to a target location within the pipe;
   said tool comprising:
      a pump down ring, wherein an outermost diameter of said ring is larger than that of any other component of said tool when the tool is in dry state;
      a swellable sleeve, upstream from said pump down ring, surrounding at least a portion of an outer surface of said tool, said sleeve being capable of expanding when exposed to a first oil or water-based fluid; and
      a fluid flow path having, at the first upper end of the tool, an entrance for pressurized abrasive fluid to flow into the tool, and multiple fluid ejection nozzles downstream of said swellable sleeve, and said multiple fluid ejection nozzles for ejection of inflowing pressurized abrasive fluid from the fluid flow path in the form of pressurized abrasive fluid jets;
      one or more flow channels connecting a portion of the outer surface of the tool downstream the pump-down ring with the lower end of the tool;
   ii) exposing said sleeve to said first oil or water-based fluid for a period sufficient to cause said sleeve to expand and seal any fluid flow bypassing the tool and thereby stopping any fluid flow to the pump-down ring from the first end;
   iii) pumping pressurized abrasive fluid into the entrance of said fluid flow path and causing ejection of pressurized abrasive fluid jets from said nozzles; and
   iv) cutting said pipe at the target location through the ejected pressurized abrasive fluid jets.

9. The method of claim 8, wherein said swellable sleeve is made of swellable rubber.

10. The method of claim 8, wherein said first oil or water-based fluid includes aqueous solutions, drilling mud or oil-based fluids.

11. The method of claim 8, wherein said abrasive fluid is a mixture of water, gel, and sand or another solid in suspension.

12. The method of claim 8, wherein said lowering is achieved by pushing said tool downhole by pumping said first oil or water-based fluid into the pipe.

13. The method of claim 8, wherein the fluid ejection nozzles are angled upstream.

14. The method of claim 8, wherein the pump down ring includes an annular fin.

15. The method of claim 14, wherein the annular fin is configured to lie flush with the inner surface of the pipe when in position.

* * * * *